March 25, 1969 H. J. BRITTON 3,434,693
TORSIONAL ROTATIONAL VALVE SEAL CONSTRUCTION
Filed May 4, 1967 Sheet 1 of 4

INVENTOR.
HARRISON J. BRITTON
BY Gregg & Stidham
ATTORNEYS

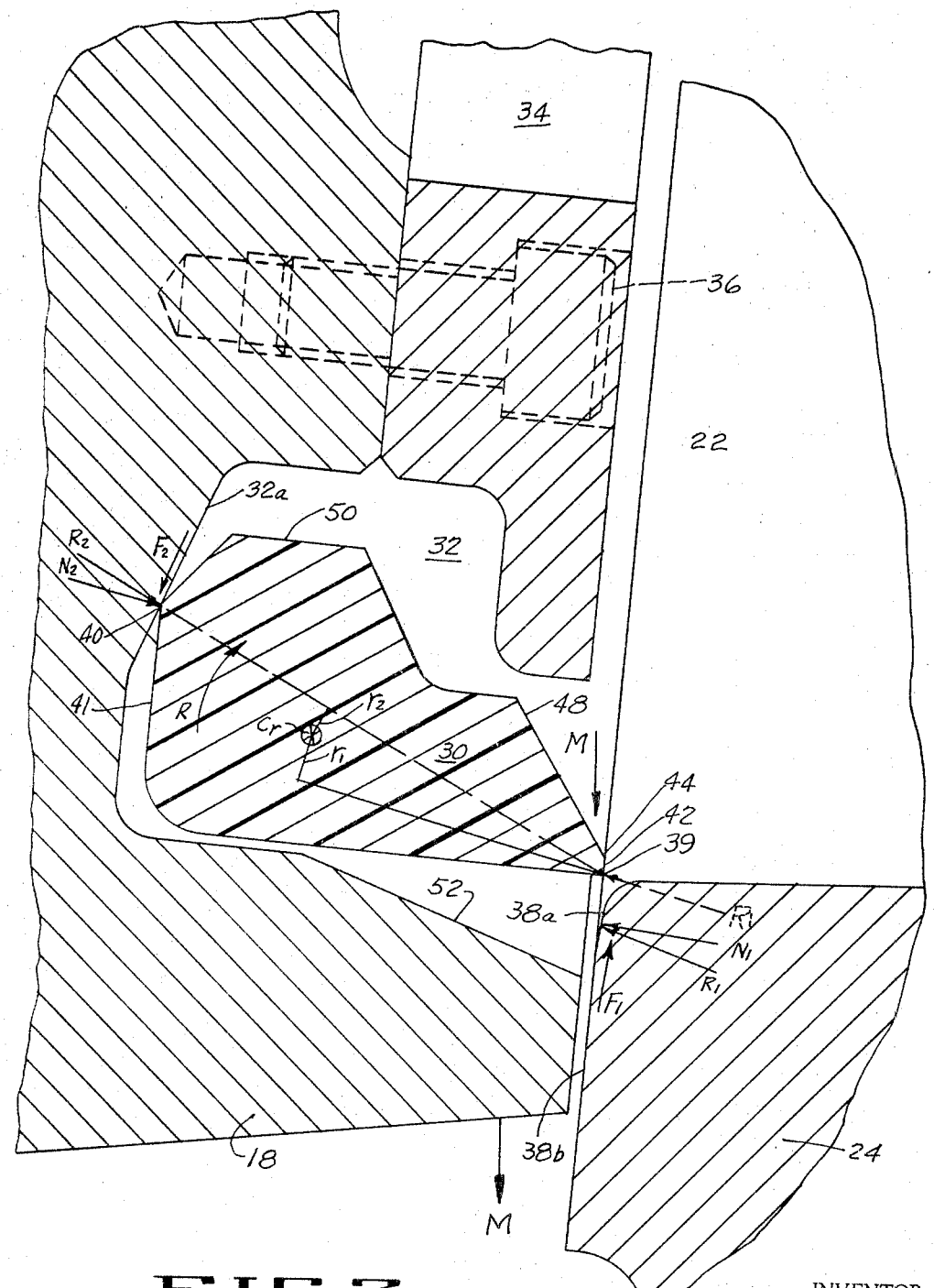
FIG-2-

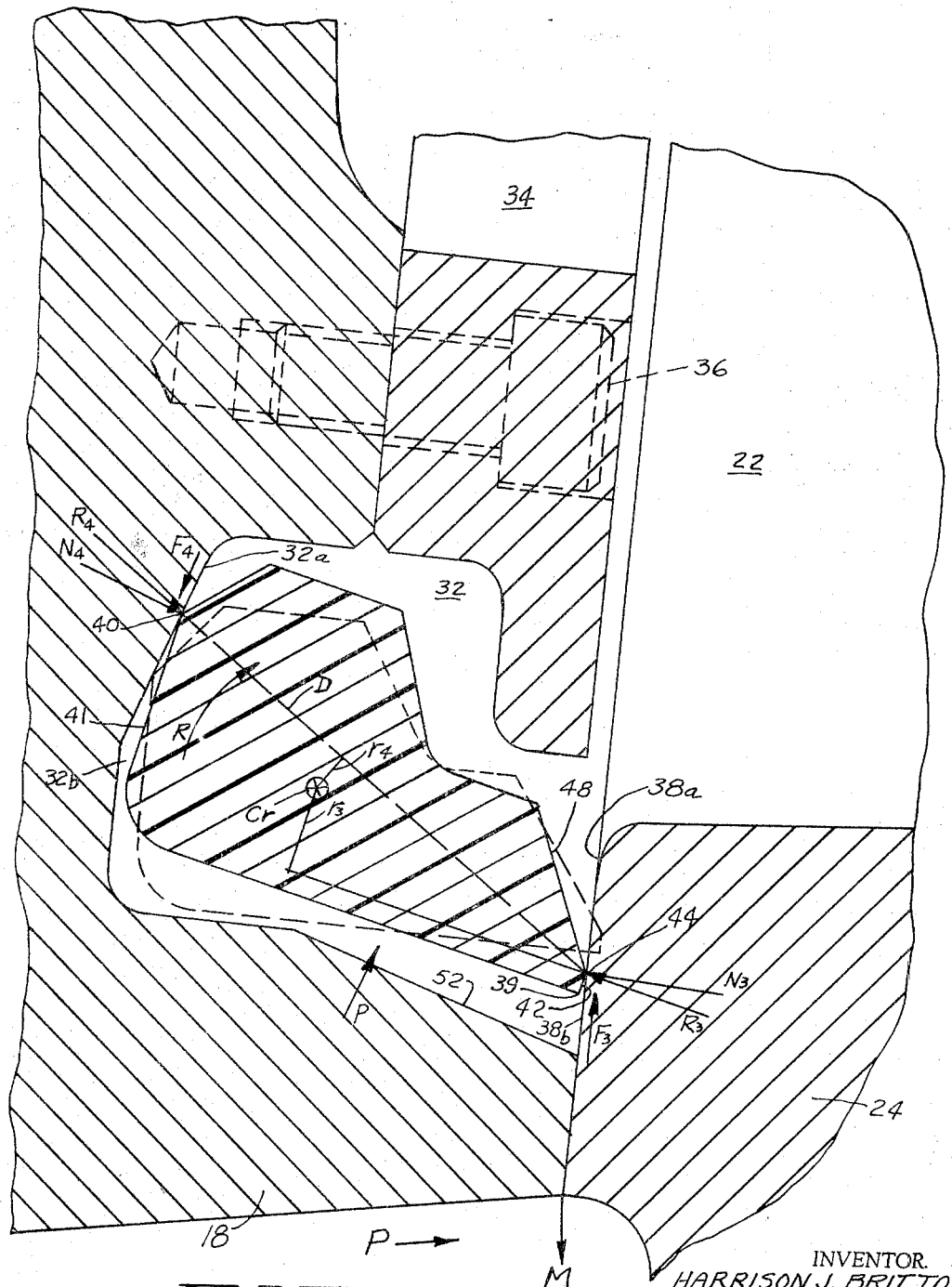
FIG-3-

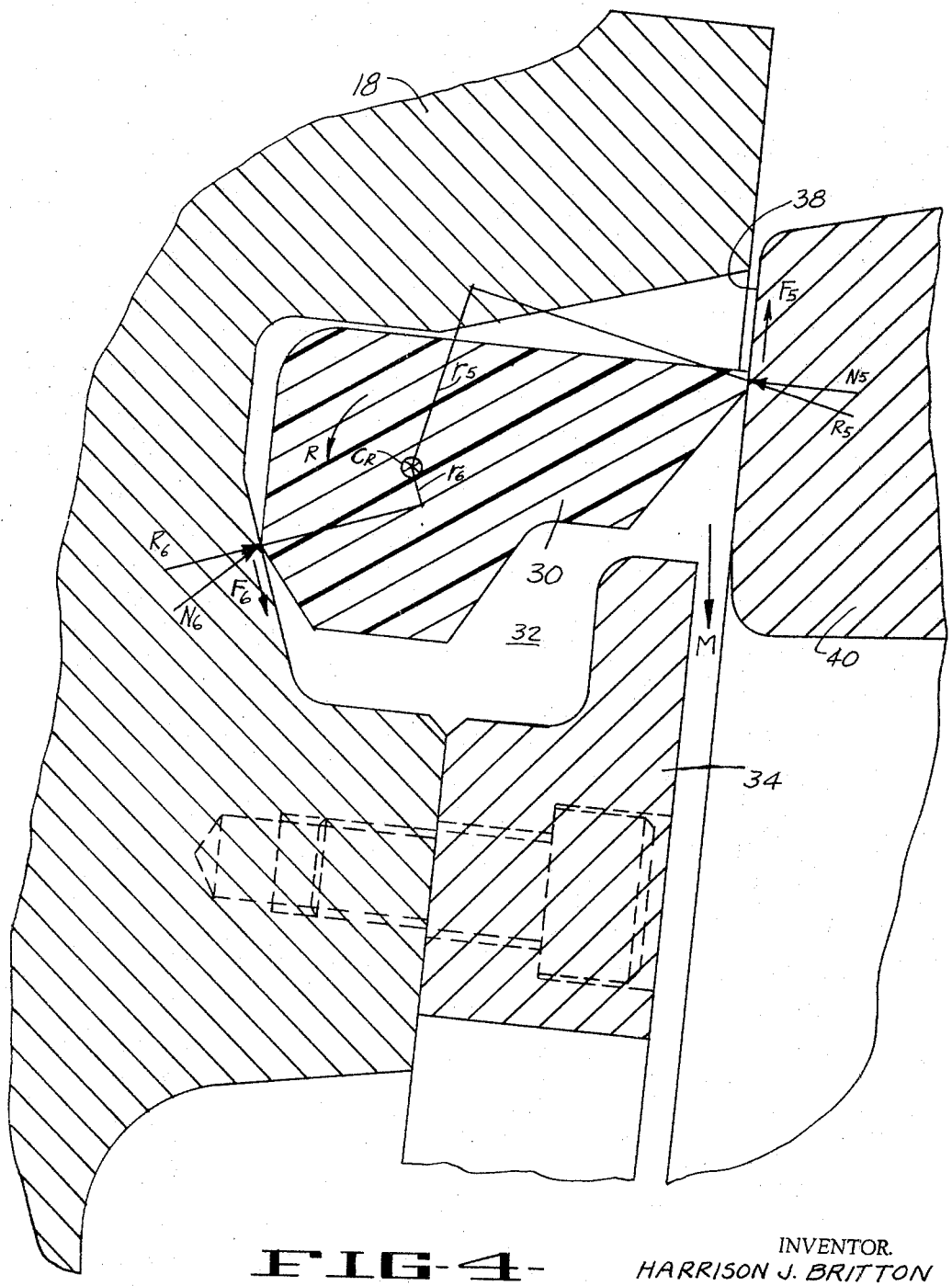
FIG-4-

United States Patent Office 3,434,693
Patented Mar. 25, 1969

3,434,693
TORSIONAL ROTATIONAL VALVE SEAL CONSTRUCTION
Harrison J. Britton, Fairhaven, N.J., assignor to Alloy Steel Products Co., Linden, N.J., a corporation of New Jersey
Filed May 4, 1967, Ser. No. 636,130
Int. Cl. F16k *3/18*
U.S. Cl. 251—203          10 Claims

ABSTRACT OF THE DISCLOSURE

A valve seal ring has an outer, large diameter sealing surface that is forced against an opposing working surface and a smaller diameter inner sealing surface on the opposite side of the cross section center of rotation so that the sealing forces generate a couple. Because of the geometry of the seal ring, this sealing couple is greater than any opposing frictional couple forcing the cross section of the seal ring to rotate in torsion. The inner sealing surface is carried on an inclined surface of the valve member to provide line contact at its inner edge. That sealing edge slides up the incline during rotation to compensate for reduction of axial dimension.

---

This invention relates to a valve seal construction and, more particularly, to a valve seal which is particularly adapted for use in cryogenic systems.

Considerable difficulty has been encountered in attempting to utilize resilient seals in valves which are installed in cryogenic systems inasmuch as most resilient materials become hard and brittle at the extremely cold temperatures ordinarily encountered in cryogenic use. Consequently, the characteristic ability of resilient materials to store energy and transmit sealing pressures is virtually nonexistent in cryogenic installations.

It has also been experienced, particularly in larger valves (8″ and up), that the valve bodies become distorted due to (1) the "unlocking" of internal stresses when subject to extreme cold temperature, and (2) the introduction of new stresses due to pipe shrinkage at low temperatures. This distortion is reflected in an "out of flatness" of the seat sealing surfaces.

It is, therefore, an object of this invention to provide a valve seal construction which provides an effective seal even under extremely cold temperature and with distorted body seat sealing surfaces.

It is a further object of this invention to provide a particularly configured valve seal ring and accommodating recess which provide a torsion seal while maintaining sealing contact between the two valve members, although the axial distance dimension between the seal ring contact circles is reduced as the seal ring is twisted.

In carrying out this invention, I provide a seal ring that is subjected to torsional movement under sealing force. The seal ring has its major cross sectional dimension disposed axially, providing greater resistance to torsional movement and, hence, a higher spring rate. The torsional movement is achieved by providing a large diameter outer sealing surface and a small diameter inner sealing surface which engage, respectively, the opposing valve working surface and the bottom of a recess in which the seal ring is contained so that sealing forces when the valve is closed are directed on opposite sides of the cross section center of rotation. In addition, the seat ring and recess are configured so as to provide a positive torsional movement overcoming the influence of friction forces on torsional rotation. In conjunction with this, the bottom of the recess is inclined so that line contact is along the inner edge of the bottom surface of the seal ring. Moreover, the inclined surface provides a gradually diminishing recess depth to compensate for the reduction in axial dimension as the seat ring is twisted.

Other objects and advantages of the invention will become apparent from the description following when read in conjunction with the accompanying drawings wherein:

FIG. 2 is an enlarged partial section view of the valve sealing means showing the bottom portion of the seal ring just before sealing is initiated;

FIG. 3 is an enlarged partial section view of the valve sealing means in fully sealed position; and FIG. 4 is an enlarged partial section view of the top portion of the seal ring as the valve is being closed.

Figure 1:
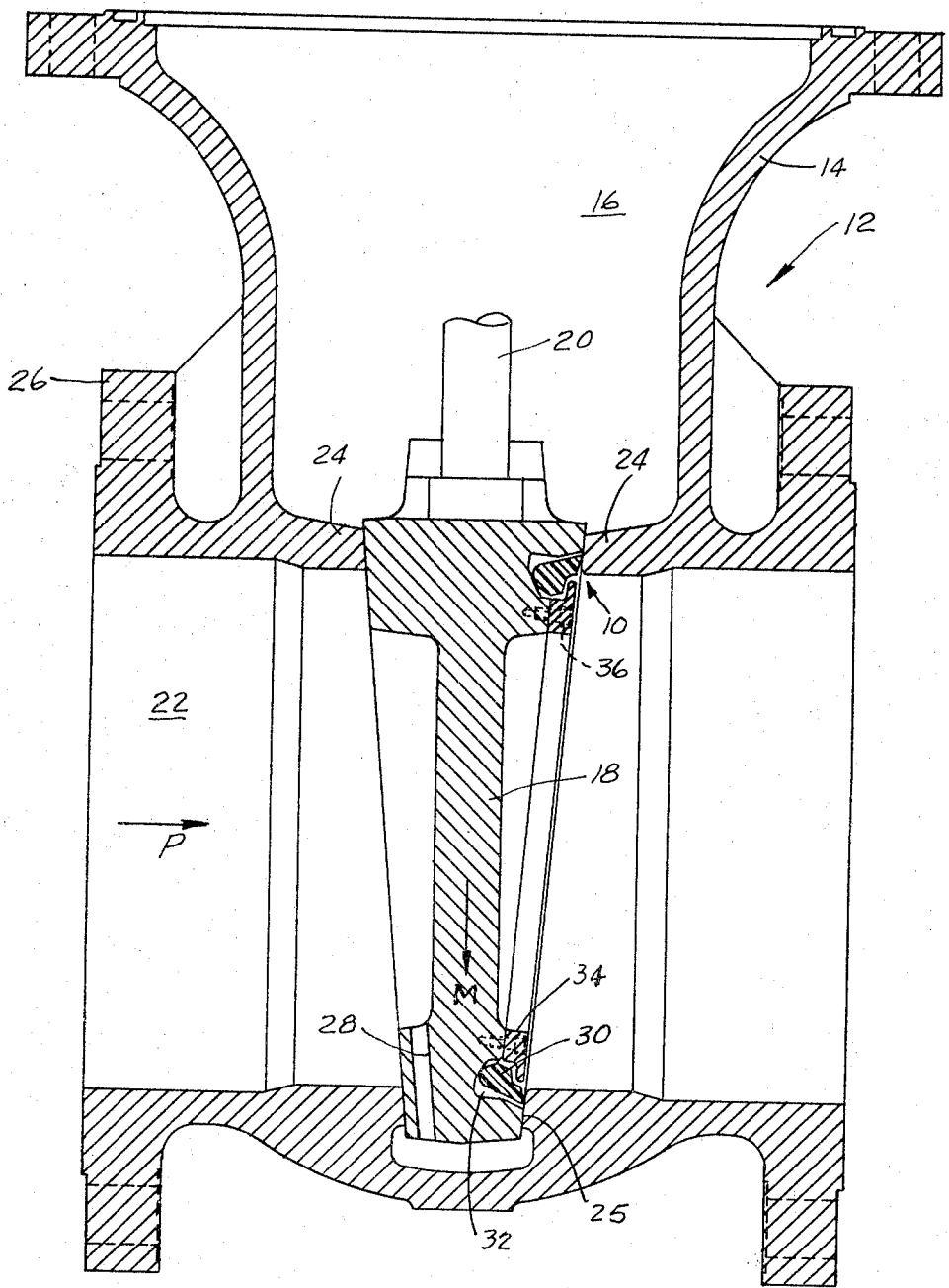
FIG. 1 is a vertical section view of a portion of a tapered seat gate valve embodying features of this invention.

Referring now more particularly to FIG. 1, my sealing means 10 is illustrated in a tapered disc gate valve 12 although it is to be understood that its utility is not limited to that particular valve structure. For example, the seal ring may be employed in parallel disc gate valves, plug valves and the like. In any event, for purposes of illustration the tapered disc gate valve may have a cast body 14 forming an enlarged body space 16 into which the gate disc 18 is retracted as by means of the valve stem 20 to open the valve and clear the flow passages 22. In the closed position shown the gate disc 18 is wedged between the opposing seats 24, 25 with the sealing means operative as hereinafter described. The valve 12 is adapted for connection into a pipe line (not shown) as by bolting to hub flanges 26.

The valve embodiment here illustrated is preferably adapted for installation in a line wherein fluid flow is from the left in FIG. 1 in the direction of the arrow P, and on the upstream side of the gate disc 18 I preferably provide a pressure relief passage 28 which prevents build-up of fluid pressure within the body space 16 as, for example, when the valve body 14 is exposed to high external temperatures. On the downstream side of the gate disc 18 my specially configurated seal ring 30 is accommodated within an annular recess 32 in the gate disc where it is retained against inadvertent removal by a seat ring retainer ring 34 which is secured to the gate disc as by means of capscrews 36.

Referring now to FIG. 2, I have shown the bottom of the seal ring 30 just prior to contact with a leading surface 38a of the valve seat 24. There, it will be noted that the leading surface is tapered at an angle greater than that of the face of the gate disc 18 and the complementary surface 38b against which the seal ring ultimately seals. Hence, with the valve gate disc 18 moving vertically in the direction of the arrow M, initial engagement is with the outer corner 39 of the seat ring. There will be a friction force $F_1$ acting along the surface 38a of the valve seat 24 tending to rotate the seat ring 30 inwardly about the center of rotation (CR) in opposition to the desired torsional movement. However, the inclined surface 38b produces a wedging force $N_1$ normal to the surface 38a which far exceeds the friction forces. Consequently, the resultant $R_1$ of these two forces is still directed on the desired side of the cross sectional center of rotation (CR), and acts about a moment arm $r_1$ tending to produce rotation in the direction of the arrow R, i.e., clockwise in FIG. 2. A like but opposite force $N_2$ acts against the bottom seal point 40 and the friction force $F_2$ produces a resultant force $R_2$ directed closer to the center of rotation through an inclined portion 32a of the bottom of the recess 32 but still about a moment arm $r_2$ to produce the desired couple. These resultant force couples $R_1 r_1$ and $R_2 r_2$ are of sufficient magnitude to rotate the cross section of the seal ring 30 outwardly or clockwise in FIG. 2. This action is implemented by reason of the fact that initial engagement and wedging force $N_1$ is through the leading corner 39 of the seal ring and the moment arms are of maximum magnitude.

As the torsional movement progresses, the outer couple force $R_1$ is delivered momentarily through the abbreviated outer surface 42 and then as the seal rocks further, the force is transmitted through the trailing or radially inner corner 44, as shown in FIG. 3. As the gate continues to move down in the direction of the arrow M the wedging forces $N_3$ and $N_4$ and the friction forces $F_3$ and $F_4$ increase, but the resultant forces $R_3$ and $R_4$ and the couples $R_3r_3$ and $R_4r_4$ increase at a more rapid rate, continuing to rotate the seal ring in the direction of the arrow R. During such rotation, the seal ring line contact point 40 slides radially inward up the inclined surface 32a of the bottom of the recess 32 while the outer contact point 44 slides radially outward on surface 38b. This rotation reduces the axial extension of the line D between the points of contact 40 and 44, but this is absorbed by reason of the fact that the depth of the recess 32 is reduced gradually toward the center. Thus, the inclined surface provides for continuous line contact with the seal edge 40; it absorbs the reduction in axial dimension during rotation, thus maintaining the required protrusion of the seal ring 30; and it provides a space 32b down-slope to accommodate the pivoting bottom surface 41 of the seal ring 30. While these advantages increase with increased slope angle, that angle should be limited to a value which would maintain the resultant rotational force components $R_2$ and $R_4$ on the side of the center of rotation (CR) opposite to that acted on by the resultant forces $R_1$ and $R_3$ so that opposing moment arms $r_3$ and $r_4$ are maintained.

Referring briefly to FIG. 4, it will be noted that friction forces $F_5$ and $F_6$ at the top of the seal ring 30 act in the opposite direction relative to the cross section to aid the desired torsional rotation. There, the resultant forces $R_5$ and $R_6$ act about relatively long moment arms $r_5$ and $r_6$ Again referring to FIG. 3, the annular sealing surfaces 44 and 40 are configurated so that they are in line contact with their cooperating surfaces 32a and 38a. However, by providing some thickness 42 adjacent the outer seal line additional strength is realized. From the front sealing corner 44 the seal ring is cut away along tapered surface 48 in order to prevent interference with the opposing sealing surface 38. By making the cross section longer in the direction of the torsional resultant forces $R_3$ and $R_4$ there is a greater resistance to torsional rotation and, hence, there is a stronger spring force storing energy and aiding sealing. This is further augmented by enlarging the width of the cross section at 50 intermediate the seal surfaces 40 and 44, further to increase the spring force. The enlarged portion 50 also insures mechanical retention of the seal ring 30 by means of the retainer ring 34. In addition, because of the inclined surface 32a it is not necessary to relieve the bottom surface 41 of the seal ring and reduce the cross sectional area, as was done at 48.

As is apparent in FIG. 3, the cross sectional area of the seal ring recess 32 is sufficiently great to accommodate the rotational movement. If desired, the outer surface of the recess may be relieved at 52 to insure that there will be no interference.

When the valve is completely closed in the position of FIG. 3, there are, of course, no friction forces and the torsional forces are directed generally along the arrows $N_3$ and $N_4$, thus increasing the torque. The spring forces stored as a consequence of this torsional rotation exist all the way around the ring and at each section of the spring force enables the ring to adjust to distortion or irregularities in the opposing seat surface.

It will also be noted in FIG. 3 that the line pressure P passing around the gate disc 18 acts against the outer and bottom surfaces of the seal ring 30. Effectively, this pressure P acts along and normal to the line D between the two sealing points 40 and 44, tending to force the seal ring radially inward. However, because the bottom of the recess 32a and the opposing working surface 38b are in converging relationship toward the center of the gate disc 18, the fluid pressure P merely urges the seal ring 30 into firmer sealing engagement.

Having described my invention, I claim:

1. In a valve construction comprising a valve body member having flow passages therethrough and a movable valve closure member movable into and out of closed position blocking said flow passages, sealing means for said valve members comprising:

an annular recess in one of said members,
a seal ring noncircular in cross section accommodated in said recess,
a complementary annular working surface on the other of said members,
a first annular sealing surface on said seal ring engageable with said working surface when said valve closure member is moved into closed position and a second annular sealing surface on said seal ring engageable with the bottom of said recess,
seal sealing surfaces being disposed on radially opposite sides of the center of rotation of the cross section of said seal ring,
said annular sealing surfaces being of such minimal areas and of such diameters throughout closing movement of said valve closure member that the generally axial forces of sealing engagement with said working surface at all points around said seal ring are concentrated about moment arms sufficiently great that the resultant sealing couples exceed the couples generated by generally radial frictional forces to produce torsional rotation of said cross section in a predetermined direction.

2. The combination defined by claim 1 wherein:
the surfaces of said seal ring adjacent said first and second sealing surfaces are disposed at an angle to said working surface and said recess bottom, respectively, to provide substantially annular line sealing contacts.

3. The combination defined by claim 2 wherein:
said annular recess is configurated to accommodate opposite generally radial movements of said first and second annular sealing surfaces.

4. The combination defined by claim 3 wherein:
said first annular sealing surface is of a diameter larger than that of said second annular sealing surface.

5. The combination defined by claim 4 wherein:
the portion of said recess bottom engaged by said second sealing surface during closing movement of said valve closure member is inclined radially inward and axially outward.

6. The combination defined by claim 5 wherein:
the angle of said inclined portion is restricted to a value wherein the resultants of sealing forces and friction forces transmitted therefrom through said second sealing surface at all points around it act on a moment arm extending radially inward from the center of rotation of the seal ring cross section.

7. The combination defined by claim 4 wherein:
the leading edge of said seal ring as said valve closure member is moved to closed position and the portion of said working surface initially contacted thereby are disposed at a wedging angle relative to each other so that the resultant of generally axial wedging forces from said working surface and the generally radial inward friction forces produce the desired radially outward torsional rotation.

8. The combination defined by claim 5 wherein:
the bottom surface of said seal ring lies in a plane generally parallel to said working surface, and
the inner edge of said bottom surface forms said second annular sealing surface in engagement with said inclined portion,
the torsional movement of said bottom surface being accommodated by said inclined portion.

9. The combination defined by claim 4 wherein:
the major axis of said seal ring extends between said inner edge and said first sealing surface,
said seal ring being of relatively narrow radial thickness adjacent said first sealing surface and tapering to a relatively wide thickness intermediate said sealing surfaces.

10. The combination defined by claim 5 wherein:
the angle of said inclined portion is sufficiently great that fluid pressure acting against said seal ring does not disengage said second sealing surface.

References Cited

UNITED STATES PATENTS 2,834,571   5/1958   Hollander _____ 251—203 X
3,331,581   7/1967   O'Connor _____ 251—174 X CLARENCE R. GORDON, *Primary Examiner.*

U.S. Cl. X.R.

251—326